United States Patent
Wolf et al.

(10) Patent No.: US 12,413,099 B2
(45) Date of Patent: Sep. 9, 2025

(54) WIRELESS ENHANCED POWER TRANSFER

(71) Applicant: SOREQ NUCLEAR RESEARCH CENTER, Yavne (IL)

(72) Inventors: Michael Wolf, Petach Tikva (IL); Boris Ginzburg, Rehovot (IL)

(73) Assignee: Soreq Nuclear Research Center, Yavne (IL)

( * ) Notice: Subject to any disclaimer, the term of this patent is extended or adjusted under 35 U.S.C. 154(b) by 59 days.

(21) Appl. No.: 17/764,189

(22) PCT Filed: Sep. 25, 2020

(86) PCT No.: PCT/IL2020/051055
§ 371 (c)(1),
(2) Date: Mar. 27, 2022

(87) PCT Pub. No.: WO2021/059285
PCT Pub. Date: Apr. 1, 2021

(65) Prior Publication Data
US 2022/0416583 A1    Dec. 29, 2022

Related U.S. Application Data

(60) Provisional application No. 62/906,128, filed on Sep. 26, 2019.

(51) Int. Cl.
*H02J 50/12* (2016.01)
*H01F 38/14* (2006.01)

(52) U.S. Cl.
CPC .............. *H02J 50/12* (2016.02); *H01F 38/14* (2013.01)

(58) Field of Classification Search
CPC .................................. H02J 50/12; H01F 38/14
See application file for complete search history.

(56) References Cited

U.S. PATENT DOCUMENTS

| | | | | |
|---|---|---|---|---|
| 4,855,703 A | * | 8/1989 | Bessho | H01F 7/202 335/299 |
| 4,987,398 A | * | 1/1991 | Bessho | H01F 7/202 335/297 |
| 9,508,680 B1 | * | 11/2016 | Ayotte | C09K 5/06 |
| 10,461,582 B2 | * | 10/2019 | White, II | H01F 38/18 |
| 10,877,072 B2 | * | 12/2020 | Riehl | H02J 50/12 |
| 11,133,712 B2 | * | 9/2021 | Maniktala | H02J 50/12 |

(Continued)

FOREIGN PATENT DOCUMENTS

WO    2018222669    12/2018

OTHER PUBLICATIONS

PCT Intl Search Report and Written Opinion dated Jan. 20, 2021 for PCT Application Serial No. PCT/IL2020/051055, filed Sep. 25, 2020.

*Primary Examiner* — Daniel Cavallari
*Assistant Examiner* — Brian K Baxter
(74) *Attorney, Agent, or Firm* — A.C. Entis IP-Ltd; Allan C. Entis

(57) ABSTRACT

A wireless power transfer (WPT) transmitter comprising: a power transmission coil having an axis; a power source operable to generate a time varying current in the power transmission coil that generates a time varying magnetic B field; and an eddy current conductor shaped and positioned to generate eddy currents responsive to the time varying current in the power transmission coil that enhance the B field generated by the time varying current.

12 Claims, 4 Drawing Sheets

(56) References Cited

U.S. PATENT DOCUMENTS

| | | | |
|---|---|---|---|
| 11,190,040 B2* | 11/2021 | Bae | H02J 50/80 |
| 11,418,062 B2* | 8/2022 | Tang | H01F 27/28 |
| 2007/0145936 A1* | 6/2007 | Simon | H02J 50/12 |
| | | | 318/693 |
| 2007/0200562 A1* | 8/2007 | Shimomura | G01V 3/102 |
| | | | 324/222 |
| 2008/0049372 A1* | 2/2008 | Loke | H02J 50/402 |
| | | | 320/108 |
| 2011/0169336 A1* | 7/2011 | Yerazunis | B66B 7/00 |
| | | | 307/104 |
| 2011/0304220 A1* | 12/2011 | Whitehead | H04B 5/263 |
| | | | 307/104 |
| 2012/0212074 A1* | 8/2012 | Uchida | H02J 50/90 |
| | | | 307/104 |
| 2013/0009632 A1* | 1/2013 | Yamamoto | G01N 27/9046 |
| | | | 324/222 |
| 2013/0076348 A1* | 3/2013 | Ide | G01N 27/9046 |
| | | | 324/232 |
| 2013/0214771 A1* | 8/2013 | Tiernan | G01N 27/904 |
| | | | 324/242 |
| 2014/0145518 A1* | 5/2014 | An | H01F 38/14 |
| | | | 307/104 |
| 2015/0089805 A1* | 4/2015 | Ayotte | B23K 1/0016 |
| | | | 29/840 |
| 2015/0326032 A1* | 11/2015 | Azancot | H02J 7/0044 |
| | | | 307/104 |
| 2015/0344266 A1* | 12/2015 | Inoue | G01D 5/20 |
| | | | 324/207.15 |
| 2016/0141099 A1* | 5/2016 | Maekawa | H01F 38/14 |
| | | | 336/15 |
| 2016/0379753 A1* | 12/2016 | Jang | H01F 38/14 |
| | | | 703/1 |
| 2017/0049387 A1* | 2/2017 | Saitoh | G16H 30/40 |
| 2017/0098960 A1* | 4/2017 | Nalbant | H01F 38/14 |
| 2017/0133134 A1* | 5/2017 | Pohl | H04B 5/0037 |
| 2017/0222491 A1* | 8/2017 | Von Novak, III | H02J 50/70 |
| 2017/0263376 A1* | 9/2017 | Verschueren | H01Q 7/08 |
| 2018/0005755 A1* | 1/2018 | Maniktala | H02J 50/12 |
| 2018/0019618 A1* | 1/2018 | Ikefuji | H02J 7/00 |
| 2018/0120083 A1* | 5/2018 | Reddy | G01B 7/30 |
| 2018/0143150 A1* | 5/2018 | Bezemer | A61B 5/4875 |
| 2018/0168057 A1* | 6/2018 | Peralta | H04B 5/26 |
| 2018/0205260 A1* | 7/2018 | Maniktala | H02J 50/12 |
| 2018/0269717 A1* | 9/2018 | Shijo | H02J 50/10 |
| 2019/0293827 A1* | 9/2019 | Widmer | B60L 50/66 |
| 2019/0369055 A1* | 12/2019 | Bi | G01N 27/9006 |
| 2020/0032670 A1* | 1/2020 | Morris | F02C 7/047 |
| 2020/0168393 A1* | 5/2020 | Long | H02J 50/12 |
| 2020/0411990 A1* | 12/2020 | Nakamura | H02J 50/502 |
| 2021/0328338 A1* | 10/2021 | Da Costa Bras Lima | H01Q 1/273 |
| 2022/0140654 A1* | 5/2022 | Sherman | H02J 50/12 |
| | | | 307/149 |

* cited by examiner

WIRELESS ENHANCED POWER TRANSFER

RELATED APPLICATIONS

The present application is a US National Phase of PCT Application No. PCT/IL2020/051055, filed on Sep. 25, 2020 which claims the benefit under 35 U.S.C. 119 (e) of U.S. Provisional Application 62/906,128 filed on Sep. 26, 2019, the disclosures of which are incorporated herein by reference.

TECHNICAL FIELD

Embodiments of the invention relate to wireless power transmission (WPT)

BACKGROUND

Wireless power transmission (WPT) by near field electromagnetic induction is used to wirelessly deliver electric energy to a wide variety of devices that includes by way of example, chargeable batteries in mobile phones, electric tooth brushes, biomedical implants such as pacemakers, electric vehicles, and such devices as Radio-Frequency IDs (RFIDs) and railway balises. Typically, a near field WPT transmitter comprises a resonant energy transmission circuit having a transmission coil and an AC power source. The AC power source drives an AC current at the resonant frequency of the transmission circuit through the transmission coil to generate a time varying magnetic field to which an inductive receiving circuit having a receiving coil may be inductively coupled to extract and store, and/or immediately use, energy from the magnetic field. The strength of the magnetic field generated by the transmission circuit along an axis of the transmission coil decreases with substantially the third power of distance. As a result, energy transfer between the WPT transmitter and the inductive receiving circuit decreases rapidly with distance between the WPT transmitter and the receiving circuit. Resonant inductive WPT systems are therefore generally practical for wireless transmission of energy only over relatively short distances.

SUMMARY

An aspect of an embodiment of the disclosure relates to providing a near field wireless enhanced power transfer system transmitter, which may be referred to by the acronym WEPT, or by WEPT transmitter, that provides enhanced near field transmission of power to electrically powered devices.

In an embodiment, a WEPT transmitter comprises a resonant energy transmission circuit comprising a transmission coil or antenna, generically referred to as a coil, an AC power source configured to drive a time varying current in the transmission coil, and an eddy current, mirror conductor, which may be referred to simply as a mirror conductor. The eddy current mirror conductor is shaped and positioned relative to the WEPT transmission coil to focus a magnetic field generated by current in the transmission coil and form a spatial region, hereinafter also referred to as a magnetic enhancement region, of relatively enhanced field intensity in the magnetic field. For a same consumption of energy, WEPT transmitter in accordance with an embodiment of the disclosure provides improved power transfer to a receiving circuit inductively coupled to the transmitter at the magnetic enhancement region than does a conventional WPT transmitter. In an embodiment the eddy current mirror conductor comprises a planar conductor positioned parallel to an axis of WEPT's transmission coil.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same label in all the figures in which they appear. Labels labeling an icon representing a component or feature in a figure may be used to refer to and identify the component or feature represented by the icon. Dimensions of components and features shown in the figures are chosen for convenience and clarity of presentation and are not necessarily shown to scale.

DETAILED DESCRIPTION

Figure 1:
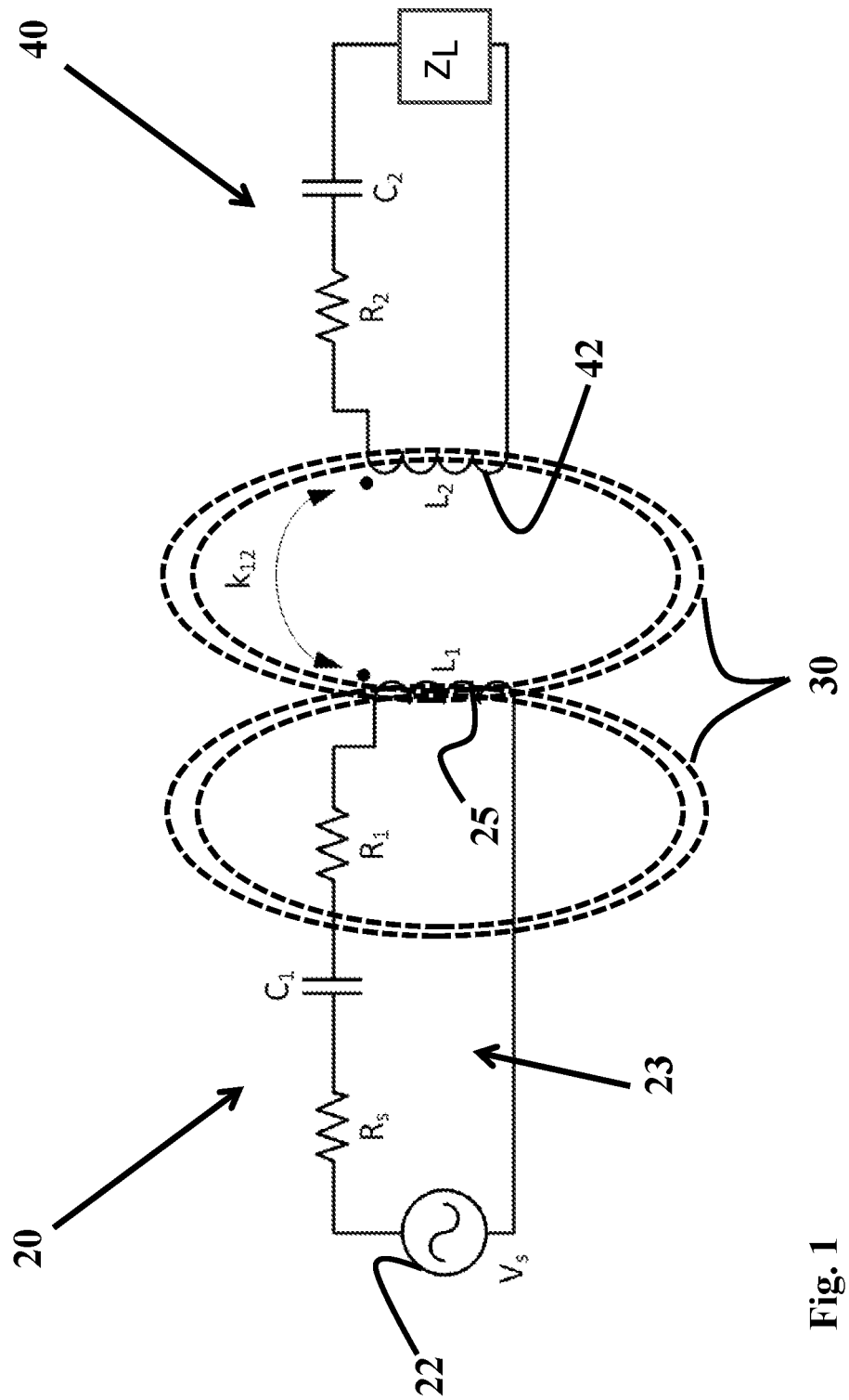
FIG. 1 schematically shows a conventional resonant inductive WPT transmitter in accordance with prior art transmitting power to a receiving circuit inductively coupled to the WPT transmitter.

FIG. 1 schematically shows a conventional WPT transmitter 20 being used to transmit power to an inductive power receiving circuit (IPRC) 40, in accordance with prior art. WPT transmitter 20 comprises an AC power source 22 having an internal resistance $R_S$ and is operable to generate an optionally harmonic time varying voltage $V_S$. Power source 22 is coupled to a resonator 23 optionally comprising a capacitance $C_1$, a resistance $R_1$ and a power transmission coil 25 having inductance $L_1$. Power source 22 and resonator circuit 23 are optionally tuned to operate as a resonant circuit characterized by a resonant frequency $f_S$ and harmonic voltage $V_S$ that varies in time with frequency $f_S$. Voltage $V_S$ produces a time varying harmonic current $I_S$ in power transmission coil 25 that generates a time varying magnetic field B schematically indicated by field lines 30. "B" is shown in bold script to indicate a vector field IPRC 40 comprises a power receiving coil 42 having inductance $L_2$ with a resistance $R_2$ optionally coupled in series with capacitance $C_2$ and a load $Z_L$ which may by way of example be a battery or RFID circuit. Optionally, IPRC 40 operates as a resonant circuit characterized by a same frequency $f_S$ that characterizes WPT transmitter 20. Receiving coil 42 of IPRC is inductively coupled to transmission coil of WPT transmitter 20 for receiving energy from the WPT transmitter by a magnetic coupling factor $k_{12}$. Coupling coefficient $k_{12}$ is proportional to an amount of the magnetic field B generated by current $I_S$ in power transmission coil 25 that is encircled by power receiving coil 42. The power transfer efficiency from WPT transmitter 20 to IPRC 40 is approximately proportional to $(k_{12})^2$.

Along an axis (not shown) of power transmission coil 25, B generated by current $I_S$ in the loop decreases approximately with the third power of distance from the loop along the axis. As a result, power coupled to IPRC 40 by WPT transmitter 20 generally decreases steeply with distance of IPRC 40 from WPT transmitter 20.

Figure 2:
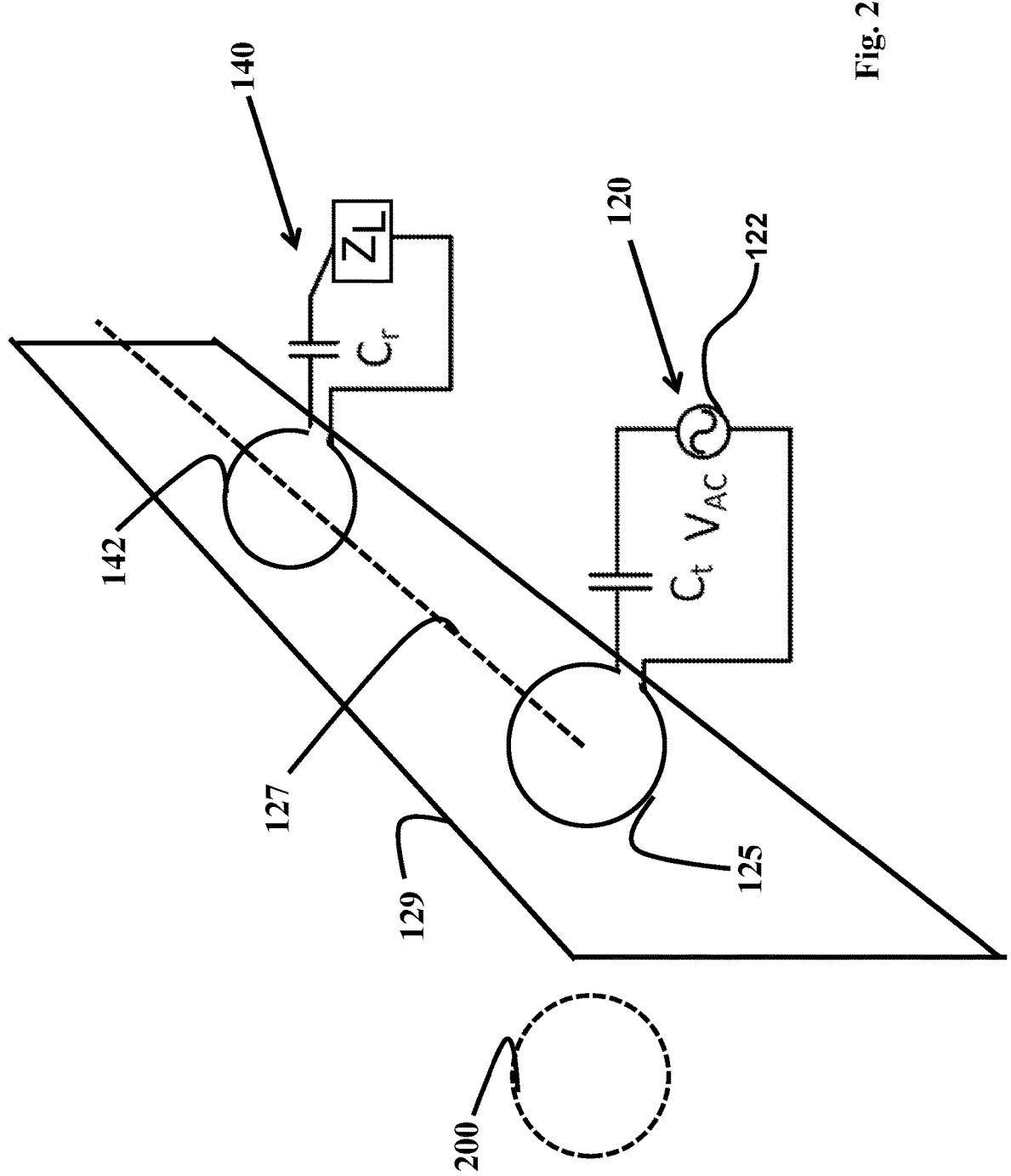
FIG. 2 schematically shows a WEPT transmitter comprising a transmission circuit and eddy current mirror conductor, in accordance with an embodiment of the invention.

FIG. 2 schematically shows a WEPT transmitter 120 operating to energize an IPRC 140 in accordance with an embodiment of the disclosure. IPRC 140 is optionally similar to IPRC 40 shown in FIG. 1 and functions substantially as a resonant circuit optionally comprising a power receiving coil 142 in series with a capacitance $C_R$ and a load $Z_L$, which may by way of example be a battery or RFID circuit.

In accordance with an embodiment, WEPT transmitter 120 functions as a resonant circuit having a resonant frequency $f_T$ and optionally comprises a power transmitting coil 125 having inductance $L_T$ and an axis 127. Coil 125 is coupled to a capacitance $C_T$ and a power source 122 operable to provide a time varying voltage $V_T$ characterized by the resonant frequency $f_T$. Voltage $V_T$ drives a current $I_T$ through power transmission coil 125, which generates a magnetic field B that varies in time with resonant frequency $f_T$.

In accordance with an embodiment, WEPT transmitter 120 also comprises an optionally planar eddy current, mirror conductor 129 positioned parallel to axis 127. Current IT flowing in power transmission coil 125 produces eddy currents in mirror conductor 129 that operate to increase the magnetic field BT along axis 127 relative to magnitude of a magnetic field that would be present along axis 127 in the absence of eddy current mirror conductor 129. In an embodiment a magnitude of BT along axis 127 is greater than that of the magnetic field in the absence of mirror conductor 129 by a field amplification factor equal to or greater than about 1.25 Optionally the field amplification factor is equal to or greater than about 1.5. In an embodiment the field amplification factor is equal to or greater than about 1.75.

Without being limited to any given theory as to how WEPT transmitter 120 creates the amplification factor, it might be considered that eddy currents generated in eddy current mirror conductor 129 responsive to current $I_T$ flowing in power transmission coil 125 produce a magnetic field equivalent to that of a virtual mirror image of $I_T$ on a side of mirror conductor 129 opposite to that of WEPT transmitter coil 125 to produce the field amplification factor. In FIG. 2 the virtual mirror image of $I_T$, also referred to as an image current of $I_T$, or simply the image current, is schematically represented by a dashed current loop 200. The mirror current is an imaginary current that enables determining the magnetic field produced by the eddy currents and current $I_T$ on the side, also referred to as the WEPT side, of mirror conductor 129 where WEPT transmitter coil 125 is located. The image current has a magnitude substantially the same as that of $I_T$ (the magnitude of the image current approaches equality with that of $I_T$ as conductivity of conductor 129 approaches that of a perfect conductor) and a direction of flow the same as that of current of current $I_T$—when $I_T$ is clockwise the image current is also clockwise and when $I_T$ is counterclockwise the image current is also counterclockwise. The magnetic field produced by the eddy currents and current $I_T$ on the WEPT side, is the same as that which would be produced by superposition of the magnetic fields generated by $I_T$ and the image current were the image current to be real and mirror conductor 129 absent.

By way of a numerical example, an experimental WEPT transmitter in accordance with an embodiment of the disclosure similar to WEPT transmitter 120 was found to provide an amplification factor of the B field equal to about 1.94. The experimental WEPT transmitter comprised a small multiturn coil and a planar eddy current mirror conductor positioned parallel to and at a distance of about 14 cm (centimeters) from an axis of the coil. The mirror conductor was a half meter by half meter square aluminum plate having thickness equal to about 5 mm (millimeters). When driven by a given current $I_T$ at a frequency of about 1290 Hz, a magnitude of the magnetic B field along the axis at a distance of about 37.5 cm (centimeters) from the power transmission coil was measured to be equal to about 350 pT (picoTeslas). Without the eddy current mirror conductor, the magnetic B filed at the same location was measured to be equal to about 180 pT.

Assume, as noted above, that a coupling coefficient $k_{12}$ between the experimental WEPT transmitter to a suitable IPRC is proportional to amplification of the magnetic B field at the IPRC, generated by the WEPT transmitter and that power transfer to the WEPT IPRC is approximately proportional to the square of the coupling coefficient. Then at about 37.5 cm from the experimental WEPT transmitter coil 125 is expected to be about 4 times faster in transmitting power to IPRC 140 than a conventional WPT transmitter similar to WPT transmitter 20.

Figure 3:
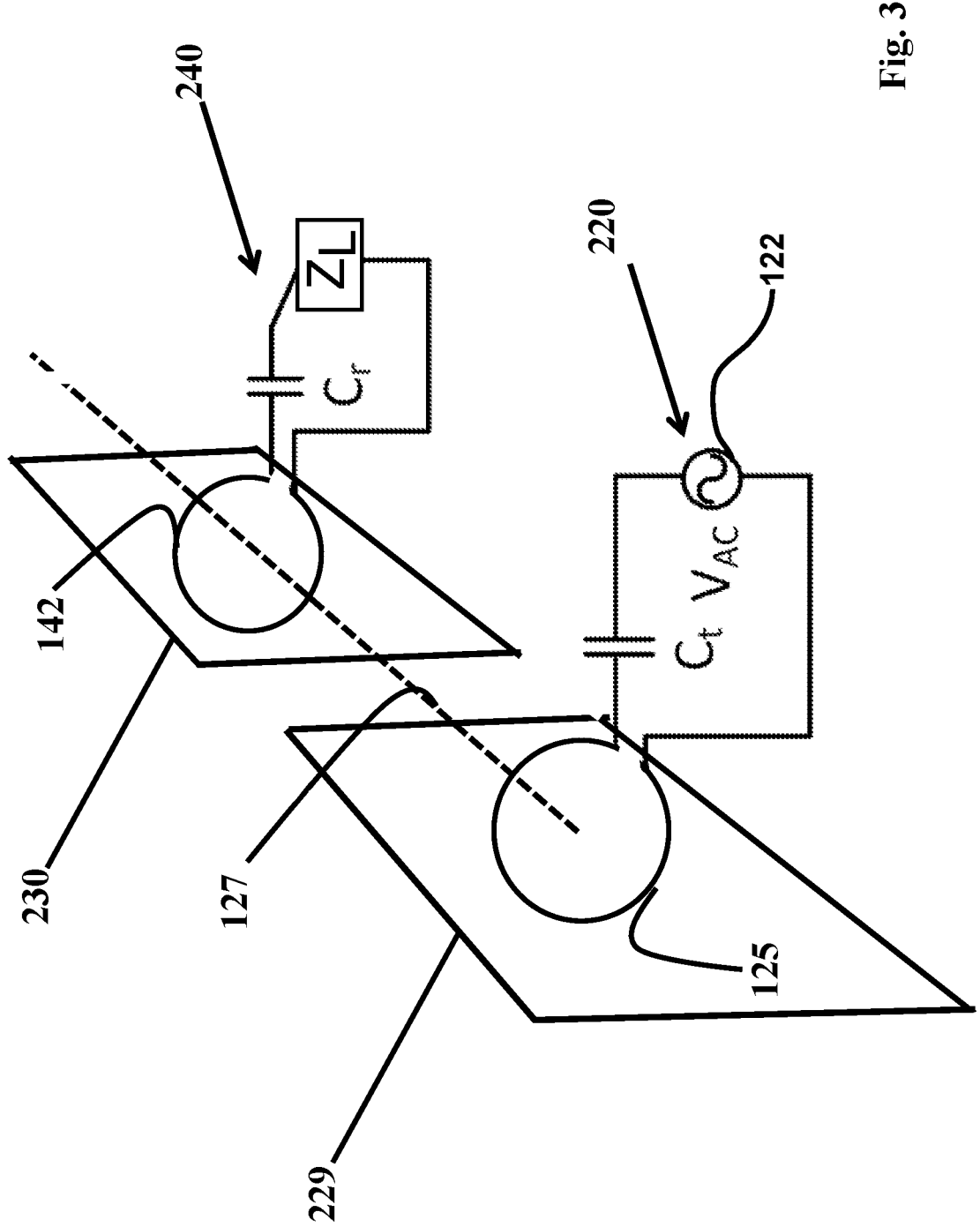
FIG. 3 schematically shows a WEPT transmitter having an eddy current mirror conductor transmitting power to a receiving circuit comprising an eddy current mirror conductor separate from the WEPT transmitter eddy current mirror conductor, in accordance with an embodiment of the disclosure.
Figure 4:
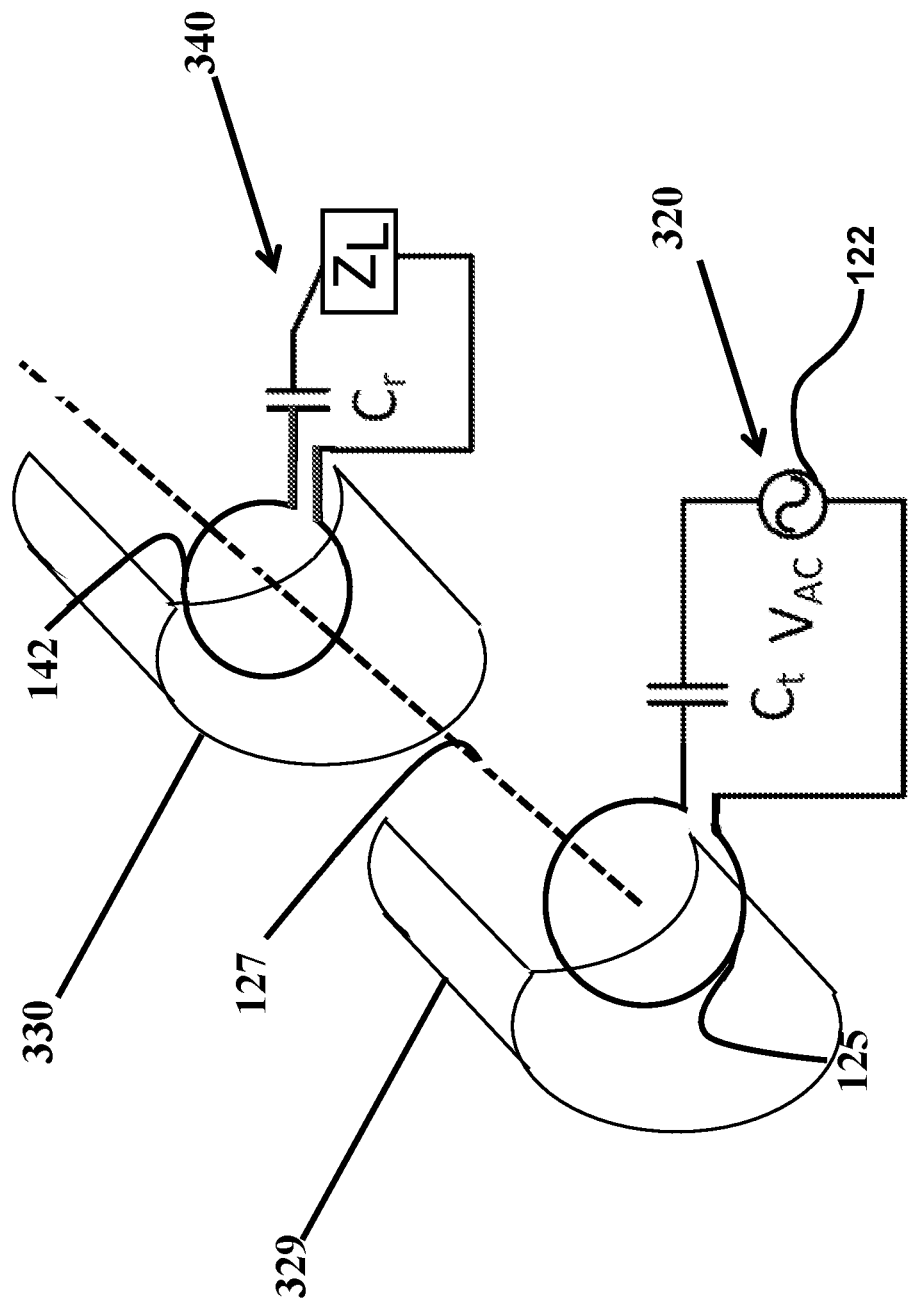
FIG. 4 schematically shows a WEPT transmitter having a curved eddy current mirror conductor inductively coupled to a receiving circuit also comprising a curved eddy current mirror conductor, in accordance with an embodiment of the disclosure.

Whereas FIG. 2 schematically shows WEPT 120 inductively coupled to IPRC 140 using a single mirror conductor 129 that is adjacent to both the WEPT and the IPRC, embodiments of the disclosure are not limited to coupling a WEPT transmitter to an IPRC using a single mirror conductor that is adjacent to both the WEPT transmitter and the IPRC. By way of example, FIG. 3 schematically shows WEPT 220 inductively coupled to an IPRC 240, in accordance with an embodiment of the disclosure. WEPT 220 is similar to WEPT 120 but comprises an optionally planar mirror image conductor 229 that does not lie adjacent to IPRC 240 to which WEPT 220 is inductively coupled. In an embodiment IPRC may comprise, as shown in FIG. 3, its own optionally planar mirror image conductor 230 separate from mirror image conductor 229. Nor is practice of embodiments of the disclosure limited to planar mirror image conductors. By way of example, FIG. 4 schematically shows a WEPT 320 comprising a curved, optionally cylindrical mirror image conductor 329, in accordance with an embodiment of the disclosure. WEPT 320 is optionally inductively coupled and transmitting power to an IPRC 340 comprising its own curved, optionally cylindrical, mirror image conductor 330, in accordance with an embodiment.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An enhanced wireless power transfer (WEPT) transmitter comprising:
   a power transmission coil having an axis;
   a power source operable to generate a time varying current $I_T$ in the power transmission coil that generates a time varying magnetic B field; and
   at least one eddy current conductor shaped and positioned to generate eddy currents responsive to the time varying current in the power transmission coil that produce an equivalent of a virtual mirror image of $I_T$ which enhances the time varying magnetic B field generated by the time varying current;
   wherein the at least one eddy current conductor extends alongside the axis and is absent slits or holes that may operate to distort the virtual mirror image of $I_T$.

2. The WEPT according to claim 1 wherein the at least one eddy current conductor comprises a planar eddy current conductor.

3. The WEPT according to claim 2 wherein a plane of the planar eddy current conductor is substantially parallel to the axis of the power transmission coil.

4. The WEPT according to claim 1 wherein the time varying magnetic B field is enhanced by a field amplification factor equal to or greater than about 1.25.

5. The WEPT according to claim 4 wherein the time varying magnetic B field is enhanced by a field amplification factor equal to or greater than about 1.5.

6. The WEPT according to claim 5 wherein the field amplification factor is equal to or greater than about 1.75.

7. The WEPT according to claim 6 wherein the field amplification factor is equal to or greater than about 2.

8. The WEPT according to claim 1, wherein the at least one eddy current conductor comprises an eddy current conductor at least a portion of which partially surrounds the axis of the power transmission coil.

9. The WEPT according to claim 8 wherein the at least one eddy current conductor that partially encircles the axis of the power transmission coil is cylindrical.

10. The WEPT according to claim 1, wherein the at least one eddy current conductor comprises a plurality of eddy current conductors.

11. The WEPT according to claim 1, wherein the at least one eddy current conductor is shaped and positioned to lie adjacent to an inductive power receiving circuit (IPRC) to which the WEPT transmits power.

12. A system comprising:
   the WEPT according to claim 1; and
   an inductive power receiving circuit (IPRC) that is inductively coupled to the WEPT to receive power from the WEPT.

* * * * *